United States Patent
Peruga Nasarre et al.

(10) Patent No.: US 12,425,278 B2
(45) Date of Patent: Sep. 23, 2025

(54) SPECTRAL SHAPING

(71) Applicant: NOKIA TECHNOLOGIES OY, Espoo (FI)

(72) Inventors: Ismael Peruga Nasarre, Tampere (FI); Juha Yli-Kaakinen, Tampere (FI); Esa Tapani Tiirola, Oulu (FI); Kari Pekka Pajukoski, Oulu (FI); Mikko Valkama, Nokia (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 130 days.

(21) Appl. No.: 18/263,511

(22) PCT Filed: Jan. 20, 2022

(86) PCT No.: PCT/EP2022/051169
§ 371 (c)(1),
(2) Date: Jul. 28, 2023

(87) PCT Pub. No.: WO2022/161836
PCT Pub. Date: Aug. 4, 2022

(65) Prior Publication Data
US 2024/0129170 A1    Apr. 18, 2024

(30) Foreign Application Priority Data
Jan. 29, 2021 (FI) .................................. 20215095

(51) Int. Cl.
*H04L 25/03* (2006.01)

(52) U.S. Cl.
CPC ............................ *H04L 25/03834* (2013.01)

(58) Field of Classification Search
CPC ................................................. H04L 25/03834
See application file for complete search history.

(56) References Cited

U.S. PATENT DOCUMENTS

| | | |
|---|---|---|
| 2017/0215170 A1 | 7/2017 | Islam et al. |
| 2019/0110261 A1 | 4/2019 | Chen et al. |
| 2019/0165981 A1* | 5/2019 | Fu ...................... H04B 1/0475 |

(Continued)

FOREIGN PATENT DOCUMENTS

| | | |
|---|---|---|
| EP | 2557708 A1 | 2/2013 |
| WO | WO 2020/155889 A1 | 8/2020 |
| WO | WO 2021/233550 A1 | 11/2021 |

OTHER PUBLICATIONS

"3rd Generation Partnership Project; Technical Specification Group Radio Access Network; NR; User Equipment (UE) radio transmission and reception; Part 2: Range 2 Standalone (Release 15)", 3GPP TS-38.101-2 V15.3.0, (Sep. 2018), 106 pages.

(Continued)

*Primary Examiner* — Rahel Guarino
(74) *Attorney, Agent, or Firm* — ALSTON & BIRD LLP

(57) ABSTRACT

To enable spectrum shaping also when excess band is used, at least one set of spectral flatness requirements amongst two or more sets comprises at least at least a first parameter value for a first in-band range, at least a second parameter value for a second in-band range and at least a third parameter value for the excess band range, and a set to be used is selected at least based on information on the use of the excess band.

20 Claims, 6 Drawing Sheets

(56) References Cited

U.S. PATENT DOCUMENTS

2021/0029551 A1 1/2021 Kazmi et al.

OTHER PUBLICATIONS

Huawei et al., "On the detection performance of pi/2-BPSK DFT-s-OFDM with transparent shaping", 3GPP TSG-RAN WG4 Meeting #84bis, R4-1710213, (Oct. 9-13, 2017), 4 pages.

Huawei et al., "Performance evaluation for pi/2 BPSK with FDSS", 3GPP TSG RAN WG1 Meeting #88bis, R1-1705060, (Apr. 3-7, 2017), 8 pages.

Iith, "Further link results for pi/2 BPSK DFT-S-OFDM waveform with spectral shaping and MMSE receiver", 3GPP TSG RAN WG4 Meeting #85, R4- 1714191, (Nov. 27-Dec. 1, 2017), 5 pages.

International Search Report and Written Opinion for Patent Cooperation Treaty Application No. PCT/EP2022/051169 dated Jun. 15, 2022, 16 pages.

Nokia et al., "On spectral shaping for uplink Pi/2 BPSK with DFT-S-OFDM", 3GPP TSG-RAN WG1 #89, R1-1709002, (May 15-19, 2017), 3 pages.

Notice of Acceptance for Finland Application No. 20215095 dated Dec. 22, 2021, 4 pages.

NTT Docomo et al., "DFT-spread OFDM with pulse shaping filter in frequency domain in evolved UTRA uplink", 3GPP TSG RAN WG1 #42 on LTE, R1- 050702, (Aug. 29-Sep. 2, 2005), 8 pages.

Office Action for Finland Application No. 20215095 dated Feb. 11, 2021, 2 pages.

Samsung, "Frequency domain spectrum shaping for DFT-s-OFDM", 3GPP TSG RAN WG1 Meeting #88bis, R1-1705332, (Apr. 3-7, 2017), 3 pages.

Search Report for Finland Application No. 20215095 dated Jun. 23, 2021, 2 pages.

Barry et al., "Digital Communication", 3rd Edition, Kluwer Academic Publishers, (2003), 843 pages.

First Examination Report for Indian Application No. 202317051015 dated Jan. 30, 2025, 6 pages.

\* cited by examiner

SPECTRAL SHAPING

CROSS-REFERENCE TO RELATED APPLICATIONS

This application is a national phase entry of International Application No. PCT/EP2022/051169, filed Jan. 20, 2022, which claims priority to Finnish Application No. 20215095, filed Jan. 29, 2021, the contents of which are hereby incorporated by reference in their entirety.

TECHNICAL FIELD

Various example embodiments relate to wireless communications.

BACKGROUND

Wireless communication systems are under constant development. Uplink coverage is one of the key performance indicators for wireless communication networks. It is often a bottleneck for network coverage. One way to increase the network coverage is to use a wider range of frequencies for transmitting data over the air. One further way to enhance network coverage is to use spectral shaping, for example to be able to increase achievable transmission power of a device for uplink transmissions.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

An aspect provides an apparatus comprising at least one processor; and at least one memory including computer program code, the at least one memory and computer program code configured to, with the at least one processor, cause the apparatus at least to perform: selecting, using at least first information on whether an excess band is used in transmissions from the apparatus, a set of spectral flatness requirements amongst two or more sets of spectral flatness requirements, wherein at least one of the two or more sets comprises at least a first parameter value for a first in-band range, at least a second parameter value for a second in-band range and at least a third parameter value for the excess band range; and defining spectrum shaping using at least the set of spectral flatness requirements selected.

In an embodiment, the at least one memory and computer program code are configured to, with the at least one processor, cause the apparatus further to at least to perform, when excess band is used in transmissions: receiving second information indicating at least whether excess band is used in receiving transmissions from the apparatus; and using the second information in the defining to determine whether attenuation in the excess band range is smaller or bigger than the third parameter value.

In embodiments, the at least one memory and computer program code are configured to, with the at least one processor, cause the apparatus further to at least to perform: using also information on modulation scheme and/or a code rate in the selection.

In embodiments, the at least one memory and computer program code are configured to, with the at least one processor, cause the apparatus further to at least to perform: using also information on an allocation size in the selection.

In embodiments, the at least one memory and computer program code are configured to, with the at least one processor, cause the apparatus further to at least to perform: defining shaping of a transition band using a roll-off parameter and defining frequency shift of the transition band and its direction based on a value of a truncation factor.

In embodiments, the spectral flatness requirements are error vector magnitude equalizer spectral flatness requirements.

In embodiments, the selecting is performed in response to receiving from a second apparatus information comprising at least as the first information that excess band is usable in the transmissions from the apparatus to the second apparatus.

In embodiments, at least one of the first information or the second information is received in a control information from a second apparatus, the control information being dynamic or semi-static.

According to an aspect there is provided an apparatus comprising at least one processor; and at least one memory including computer program code, the at least one memory and computer program code being configured to, with the at least one processor, cause the apparatus at least to perform: causing informing a first apparatus using in-band and excess band in transmissions from the first apparatus to the apparatus whether a spectrum shaping is performed to received transmissions.

In an embodiment, the at least one memory and computer program code are configured to, with the at least one processor, cause the apparatus further to perform spectrum shaping of received transmissions at least by: performing channel estimation on whole allocation comprising the in-band allocation and the excess band allocation for transmissions from the first user apparatus; calculating a sub-carrier wise product with the result of the channel estimation; combining excess band and in-band resource elements and channel estimations; and performing power equalization on the in-band portion of the result of the combining.

According to an aspect there is provided a method for an apparatus, the method, when performed by the apparatus, comprising: selecting, using at least first information on whether an excess band is used in transmissions from the apparatus, a set of spectral flatness requirements amongst two or more sets of spectral flatness requirements, wherein at least one of the two or more sets comprises at least a first parameter value for a first in-band range, at least a second parameter value for a second in-band range and at least a third parameter value for the excess band range; and defining spectrum shaping using at least the set of spectral flatness requirements selected.

According to an aspect there is provided a method for an apparatus, the method, when performed by the apparatus, comprising: causing informing a first apparatus using in-band and excess band in transmissions from the first apparatus to the apparatus whether a spectrum shaping is performed to received transmissions.

According to an aspect there is provided a computer-readable medium comprising program instructions, which, when run by an apparatus, causes the apparatus to to carry out at least one of a first process or a second process, wherein the first process comprises: selecting, using at least first information on whether an excess band is used in transmissions from the apparatus, a set of spectral flatness requirements amongst two or more sets of spectral flatness requirements, wherein at least one of the two or more sets comprises at least a first parameter value for a first in-band range, at least a second parameter value for a second inband range and at least a third parameter value for the excess band range; and defining spectrum shaping using at least the set of spectral flatness requirements selected; wherein the second process comprises: causing informing a first apparatus using in-band and excess band in transmissions from the first apparatus to the apparatus whether a spectrum shaping is performed to received transmissions.

According to an aspect there is provided a computer-readable medium comprising program instructions, which, when run by an apparatus, causes the apparatus to to carry out at least: selecting, using at least first information on whether an excess band is used in transmissions from the apparatus, a set of spectral flatness requirements amongst two or more sets of spectral flatness requirements, wherein at least one of the two or more sets comprises at least a first parameter value for a first in-band range, at least a second parameter value for a second inband range and at least a third parameter value for the excess band range; and defining spectrum shaping using at least the set of spectral flatness requirements selected.

According to an aspect there is provided a computer-readable medium comprising program instructions, which, when run by an apparatus, causes the apparatus to carry out at least: causing informing a first apparatus using in-band and excess band in transmissions from the first apparatus to the apparatus whether a spectrum shaping is performed to received transmissions.

According to an aspect there is provided a non-transitory computer-readable medium comprising program instructions, which, when run by an apparatus, causes the apparatus to to carry out at least one of a first process or a second process, wherein the first process comprises: selecting, using at least first information on whether an excess band is used in transmissions from the apparatus, a set of spectral flatness requirements amongst two or more sets of spectral flatness requirements, wherein at least one of the two or more sets comprises at least a first parameter value for a first in-band range, at least a second parameter value for a second in-band range and at least a third parameter value for the excess band range; and defining spectrum shaping using at least the set of spectral flatness requirements selected; wherein the second process comprises: causing informing a first apparatus using in-band and excess band in transmissions from the first apparatus to the apparatus whether a spectrum shaping is performed to received transmissions.

According to an aspect there is provided a non-transitory computer-readable medium comprising program instructions, which, when run by an apparatus, causes the apparatus to to carry out at least: selecting, using at least first information on whether an excess band is used in transmissions from the apparatus, a set of spectral flatness requirements amongst two or more sets of spectral flatness requirements, wherein at least one of the two or more sets comprises at least a first parameter value for a first in-band range, at least a second parameter value for a second in-band range and at least a third parameter value for the excess band range; and defining spectrum shaping using at least the set of spectral flatness requirements selected.

According to an aspect there is provided a non-transitory computer-readable medium comprising program instructions, which, when run by an apparatus, causes the apparatus to to carry out at least: causing informing a first apparatus using in-band and excess band in transmissions from the first apparatus to the apparatus whether a spectrum shaping is performed to received transmissions.

According to an aspect there is provided a computer program comprising instructions which, when the program is executed by an apparatus, cause the apparatus to carry out at least one of a first process or a second process, wherein the first process comprises: selecting, using at least first information on whether an excess band is used in transmissions from the apparatus, a set of spectral flatness requirements amongst two or more sets of spectral flatness requirements, wherein at least one of the two or more sets comprises at least a first parameter value for a first in-band range, at least a second parameter value for a second inband range and at least a third parameter value for the excess band range; and defining spectrum shaping using at least the set of spectral flatness requirements selected; wherein the second process comprises: causing informing a first apparatus using in-band and excess band in transmissions from the first apparatus to the apparatus whether a spectrum shaping is performed to received transmissions.

According to an aspect there is provided a computer program comprising instructions which, when the program is executed by an apparatus, cause the apparatus to carry out at least: selecting, using at least first information on whether an excess band is used in transmissions from the apparatus, a set of spectral flatness requirements amongst two or more sets of spectral flatness requirements, wherein at least one of the two or more sets comprises at least a first parameter value for a first in-band range, at least a second parameter value for a second inband range and at least a third parameter value for the excess band range; and defining spectrum shaping using at least the set of spectral flatness requirements selected.

According to an aspect there is provided a computer program comprising instructions which, when the program is executed by an apparatus, cause the apparatus to carry out at least: causing informing a first apparatus using in-band and excess band in transmissions from the first apparatus to the apparatus whether a spectrum shaping is performed to received transmissions.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
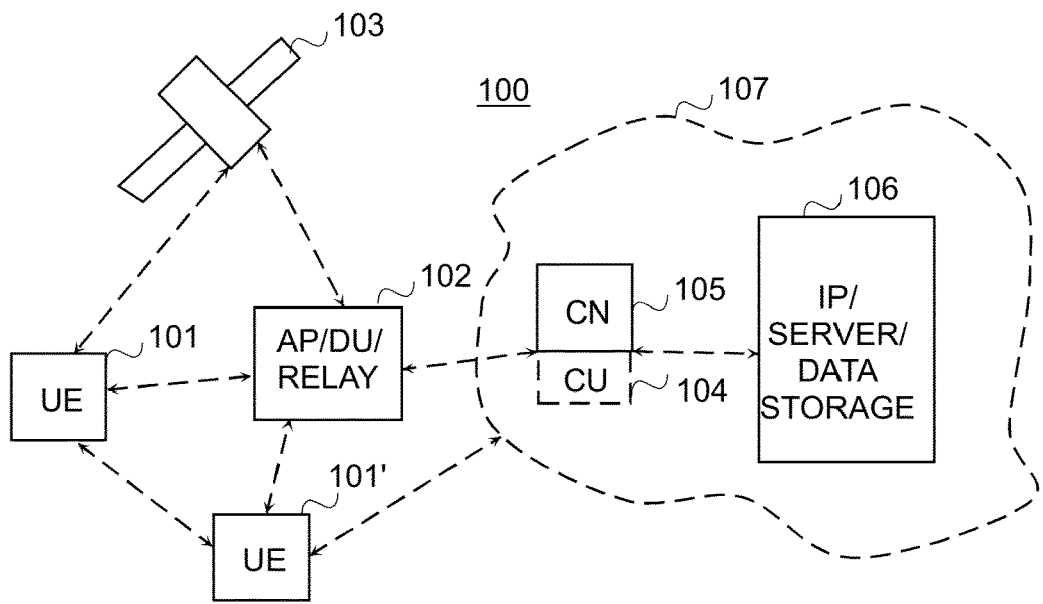
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment.

The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus.

The user device typically refers to a portable computing device that includes wireless mobile communication devices operating with a subscription entity, for example a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, wearable device, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomous self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more integrated access and backhaul (IAB) nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
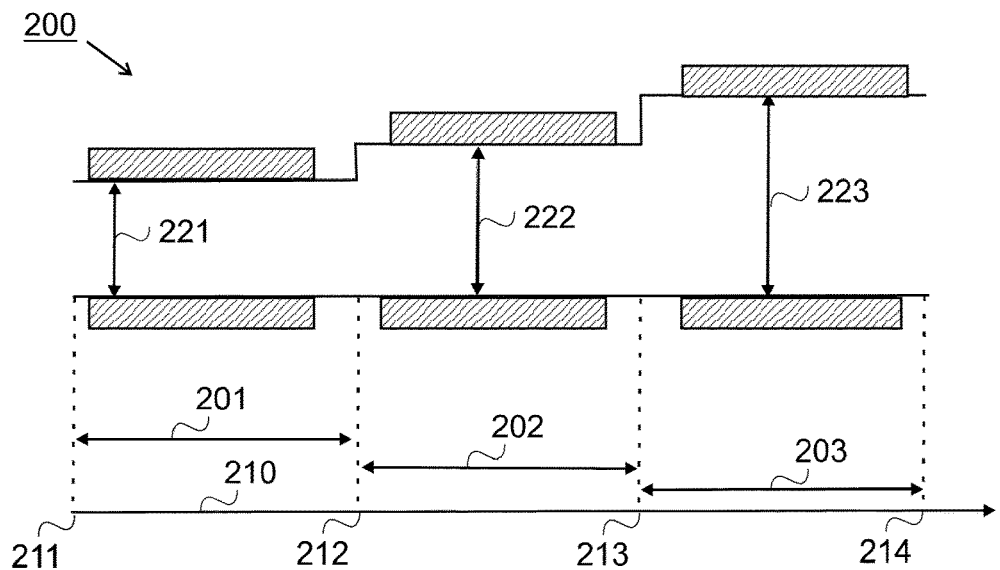
FIGS. 2, 2A and 3 are schematic block diagrams.

In 5G and beyond 5G, different spectral requirements may be defined separately for different frequency ranges. FIG. 2 illustrates an example of basic principles of different spectral requirements for different frequency ranges, for example for EVM (error vector magnitude) equalizer spectral flatness, across an allocated uplink block of physical resource blocks. The bandwidth of the allocated uplink block, denoted by $F_{alloc}$, comprises in-band bandwidth, i.e. frequency resources for data transmission, denoted as $F_{data}$, and excess band bandwidth, i.e. frequency resources in the excess band, denoted as $F_{ext}$. The spectral flatness requirements may be used by a transmitting apparatus to optimize its filter configuration.

Referring to FIG. 2, the illustrated frequency range definition is a three-part frequency definition, depicted starting from a center 211 of the bandwidth of the allocated uplink block: there is a first range 201, a second range 202, and a third range 203. In other words, x-axis in FIG. 2 shows a positive side of frequencies, starting from middle of the center frequency. Similar definitions exist for the lower frequencies symmetrically. The bandwidth of the allocated uplink block, $F_{alloc}$, is two times the bandwidths illustrated in FIG. 2. The first range 201 is an in-band range from the center frequency 211 of the allocated uplink block to a frequency 212, which is one quarter of the allocated uplink block, i.e. $F_{alloc}/4$ in frequency (arrow 210). The second range 202 is another in-band range, from the frequency 212, i.e. $F_{alloc}/4$, to a corresponding end 213 of allocated frequency resources for data transmission, which is ($F_{alloc}-F_{ext})/2$. The third range 203 is an excess band range from the end 213 of allocated frequency resources for data transmission to the corresponding end 214 of allocated frequency, i.e. to $F_{alloc}/2$. Using the above, the bandwidth allocated for data transmission is two times the depicted in-band ranges, i.e. Fdata=2*(range 201+range 202), and the bandwidth of the excess band is twice the depicted excess band range, i.e. $F_{ext}$=2*range 203.

The different spectral flatness requirements, depicted by flatness value ranges 221, 222, 223, may be seen as attenuation limits 221, 222, 231 (attenuation limits of a filter for different frequency ranges inside of the allocation), which limits may be different for different bands. The attenuation limits may be given by parameter values, for example X1 to the first range 201, X2 to the second range 202 and X3 to the third ranges (excess band range). As can be seen also from FIG. 2, the third range 223 covering the excess band can have less tight spectral flatness requirements due to the fact that the excess band is not primarily carrying the information, but rather a partial copy of some of the in-band sub carriers, for example. Further, in some implementation the excess band may be used by the receiving end of the transmission, which provides further frequency diversity, and allows to collect the signal energy send via the excess band, and thereby also allows even more less tight spectral flatness requirements.

There may be different sets of the spectral flatness requirements, for example for different scenarios, such as different in-band frequency, and/or different frequency bands. The parameter value(s) of X3, applied for excess band may depend also on the size of the excess band. In other words, there may be a plurality of sets, and the actual parameter values used, may depend on several factors. For example, modulation scheme and/or coding scheme and/or modulation and coding scheme and/or physical resource block allocation, for example size and/or location within a channel bandwidth or bandwidth part, and/or be implicitly tied to uplink resources allocation signalling, like DCI_format 0_0 and/or 0_1. Just for illustrative purposes, a highly simplified example is given in the following table when modulation π/2 BPSK (pi/2 binary phase shift keying) is used in different use scenarios of excess band. The values for parameters are maximum ripples in corresponding frequency ranges, using the logic how the EVM (error vector magnitude) equalizer spectrum flatness is defined in terms of the maximum peak-to-peak ripple of the equalizer coefficients (dB) across the allocated uplink block.

|  | X1 | X2 | X3 |
|---|---|---|---|
| set 1 (exc. band in TX and Rx) | 0-6 dB | 6-14 dB | 14-17 dB |
| set 2 (exc. band in TX) | 0-6 dB | 6-14 dB | 17-20 dB |
| set 3 (no exc. band) | 0-6 dB | 6-14 dB | — |

As said above, there may be different sets, for example, for different modulation coding schemes and/or resource block allocations, or they may be taken into account when selecting a value within the range indicated by the corresponding parameter. Further, there may be different sets for different inband frequency ranges that are possibly used and/or for different frequency bands. For example, when operating in Frequency Range 1, denoted FR1, (for example below 7 GHz) the transmitting device may operate according to FR1-specific set or sets, and when operating in Frequency Range 2, denoted FR2, (for example between 28 GHz to 39 GHz) the transmitting device may operate according FR2-specific set or sets, respectively. The parameter values for the excess band may further depend on the size of the excess band.

Figure 2A:
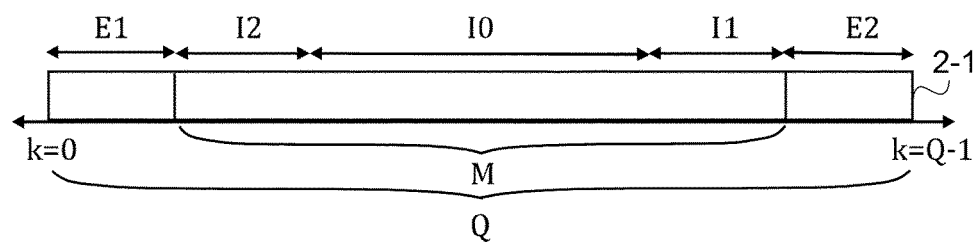

FIG. 2A illustrates resources 2-1 allocated to data transmission using both excess band and in-band. In FIG. 2A both the positive side (on right hand side) and the negative side (on left hand side) are illustrated.

Referring to FIG. 2A, Q denotes the size of all allocated frequency bins (a.k.a. as frequency domain resource elements), a bin having index k=0, 1, ... Q-1. The frequency bins allocated in the excess band (for the frequency range 203 in FIG. 2 in the negative side and in the positive side) have a size E1 plus E2. M denotes the size of the frequency bins allocated in the in-band. The size is a sum sizes of frequency bins allocated for the frequency ranges 201 and 202 in FIG. 2 in the negative side and in the positive side. The middlemost allocated bins have size 10, which is the size allocated for the frequency range 201 in FIG. 2 in the negative and in the positive side. The bins allocated for the frequency range 202 in the negative and in the positive side have sizes 12 and I1, correspondingly.

Figure 3:
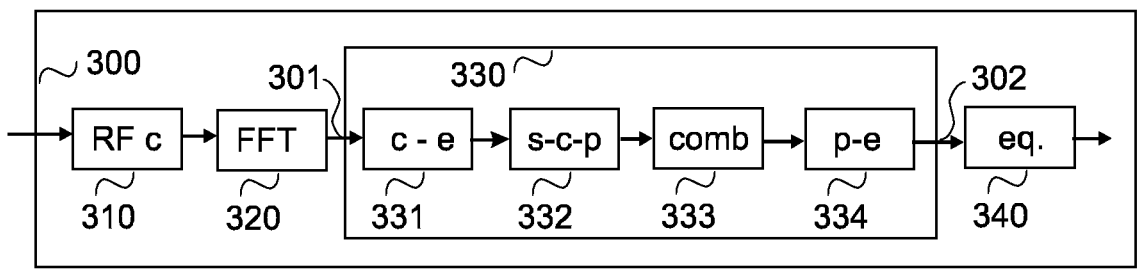

FIG. 3 illustrates an example of a receiving side apparatus that is configured to utilize the excess band.

Referring to FIG. 3, the apparatus 300 is configured to jointly estimate frequency shaping applied when a signal was transmitted and correct the received signal by means of a reception shaping unit 330 comprising a channel estimation unit (c-e) 331, a subcarrier-wise product with channel estimation unit 332 (s-c-p), an excess band and in-band combination unit 333 (comb) and an in-band power equalization unit 334 (p-e). The size of the allocated resources Q for signal (received data) 301 input to the reception shaping unit may be expressed as $(1+\alpha)M$, when M is the size of allocated resources in the in-band and $\alpha M$ is the size of allocated resources in the excess band, wherein $0 \leq \alpha < 1$. The size of the output 302 is M.

More precisely, using the example illustrated in FIG. 2A, received data (i.e. received signal), is input to a radio frequency correction unit 310 (RF c) to remove a cyclic prefix. Then the signal undergoes a fast Fourier transform (FFT) in a corresponding unit 320 and Q allocated frequency bins are taken to obtain R(k) for k=0, 1, ... Q-1. The wireless channel used is estimated (unit 331) for the whole band, including the in-band and excess band resulting to an estimated channel denoted as $\hat{H}(k)$. Then a sub-carrier wise product with the channel estimation is calculated (units 332), including in-band and excess band. In other words, following is calculated for k=0, 1, ... Q-1:

$\hat{R}(k) = \hat{H}(k) \cdot R(k)$

Then excess band resource elements and in-band resource elements are combined (unit 333), for example as:

$$\check{R}(k) = \begin{cases} \hat{R}(k) + \hat{R}(k+M), & k \in I2 \\ \hat{R}(k), & k \in I0 \\ \hat{R}(k) + \hat{R}(k-M), & k \in I1 \end{cases}$$

wherein

I0, I1 and I2 are explained above with FIG. 2A.

Corresponding combination is also performed for the power of the 2 estimated channel $|\hat{H}(k)|^2$ to obtain the power of the combined estimated channel $|\check{H}(k)|^2$. (The combined estimated channel may be called corrected channel.) Then a power equalization is performed (unit 334) over the combined estimated channel and combined signal in the in-band to obtain an almost flat frequency spectrum as:

$$\tilde{R}'(k) = \frac{\check{R}(k)}{|\check{H}(k)|^2 + \sigma_N^2}$$

wherein the noise variance $\sigma_N^2$, when a test receiver is used for error vector magnitude computation, can be set to be zero. Then the processing of the signal continues by performing first, by a transmission-reception (Tx-Rx) chain equalizer unit 340 (eq.) chain equalization, in the same way as would have happened after the fast Fourier transformation if no excess band would have been utilized in the reception.

FIGS. 4 to 10 are different flowcharts illustrating different examples of functionalities of a transmitting apparatus, for example a user device. In the illustrated examples it is assumed, for the clarity of description, that the transmitting apparatus comprises in its memory the different sets (parameters) of spectral flatness requirements. However, it should be appreciated that any other way may be used, for the apparatus may be configured to retrieve a set from a cloud storage.

Figure 4:
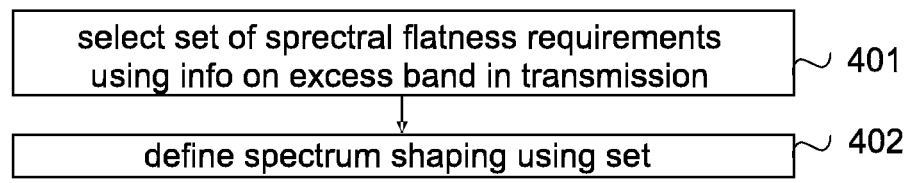
FIGS. 4 to 10 are flow charts illustrating different examples of functionalities.

Referring to FIG. 4, the apparatus is configured to select in block 401, using at least information (first information) on whether an excess band is used in transmission from the apparatus, a set of spectral flatness requirements amongst two or more sets of spectral flatness requirements, wherein at least one of the two or more sets is based on what is illustrated in FIG. 2, i.e. comprises at least a first parameter value for a first in-band range, at least a second parameter value for a second in-band range and at least a third parameter value for the excess band range. When the set of spectral flatness requirement is selected, the apparatus is configured to define in block 402 spectrum shaping using at least the set of spectral flatness requirements selected. The thus defined spectrum shaping will be used in shaping or filtering of transmissions transmitted using allocated resources, for example by means of truncated windows, as will be described in more detail with FIG. 11.

Figure 5:
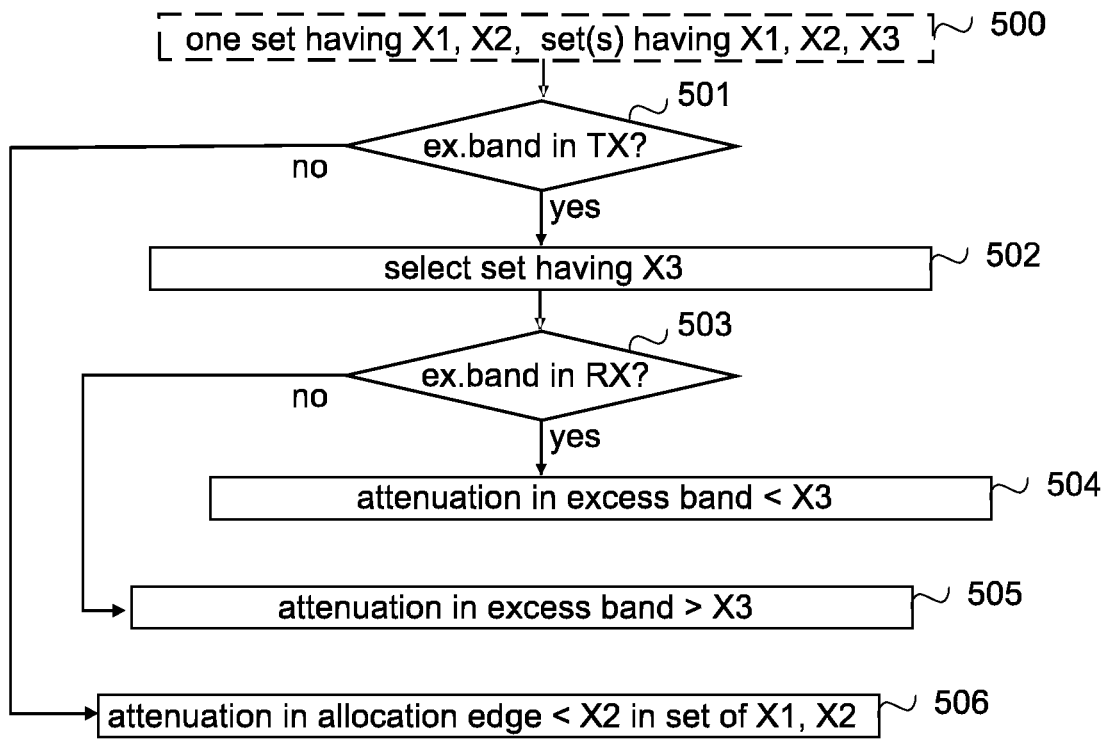

In the example illustrated in FIG. 5, the apparatus comprises two or more sets of spectral flatness requirements, one of them having parameter values X1 and X2, no parameter value X3, and at least one set having parameter values X1 and X2 and also a parameter value X3 for the excess band. This is depicted by dashed block 500.

When the excess band is used in transmissions (block 501:yes), in the illustrated example a set having a value for X3 is selected, and if the excess band is used in reception (block 503: yes), attenuation in the excess band is selected in block 504 to be smaller than the parameter value X3. If the excess band is not used in the reception (block 503: no), attenuation in the excess band is selected in block 504 to be bigger than the parameter value X3.

When the excess band is not used in transmission, attenuation in the allocation edge is selected in block 506 to be smaller than the parameter value X2 in the set having parameter values X1 and X2 (no parameter value X3). Depending on the embodiment, parameter values for X1 and X2 may vary according to the presence of the parameter value X3. For example, when the excess band is deployed (X3 is present), X1 and X2 can be defined according to first criteria, e.g. higher (or lower) attenuation, and when the excess band is not deployed (X3 is absent), X1 and X2 can be defined according to second criteria, e.g. lower (or higher) attenuation.

Figure 6:
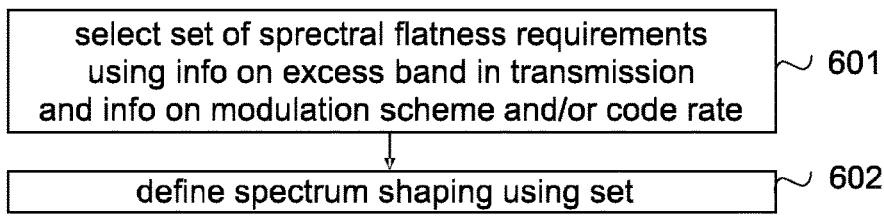

Referring to FIG. 6, the apparatus is configured to select in block 601, using at least information (first information) on whether an excess band is used in transmission from the apparatus and information (second information) on modulation scheme used and/or code rate used for transmission, a set of spectral flatness requirements amongst two or more sets of spectral flatness requirements, wherein at least one of the two or more sets is based on what is illustrated in FIG. 2, i.e. comprises at least a first parameter value for a first in-band range, at least a second parameter value for a second in-band range and at least a third parameter value for the excess band range. When the set of spectral flatness requirement is selected, the apparatus is configured to define in block 602 spectrum shaping using at least the set of spectral flatness requirements selected. The thus defined spectrum shaping will be used in shaping or filtering of transmissions transmitted using allocated resources.

Figure 7:
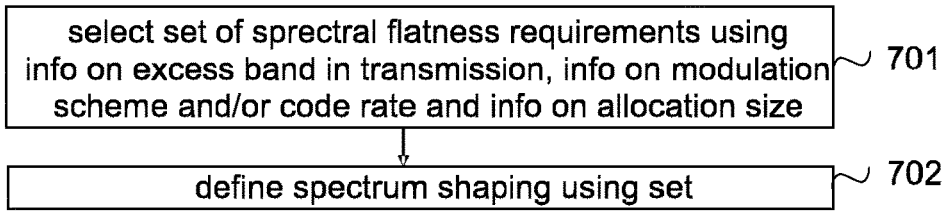

Referring to FIG. 7, the apparatus is configured to select in block 701, using at least information (first information) on whether an excess band is used in transmission from the apparatus, information (second information) on modulation scheme used and/or code rate used for transmission, and information on an allocation size, a set of spectral flatness requirements amongst two or more sets of spectral flatness requirements, wherein at least one of the two or more sets is based on what is illustrated in FIG. 2, i.e. comprises at least a first parameter value for a first in-band range, at least a second parameter value for a second in-band range and at least a third parameter value for the excess band range. When the set of spectral flatness requirement is selected, the apparatus is configured to define in block 702 spectrum shaping using at least the set of spectral flatness requirements selected. The thus defined spectrum shaping will be used in shaping or filtering of transmissions transmitted using allocated resources.

The information on the allocation size may comprise Information on in-band size and/or information on excess band size and/or information on a roll-off parameter defining a shape of a transition band and/or frequency location on a bandwidth part and/or frequency location on a carrier.

Figure 8:
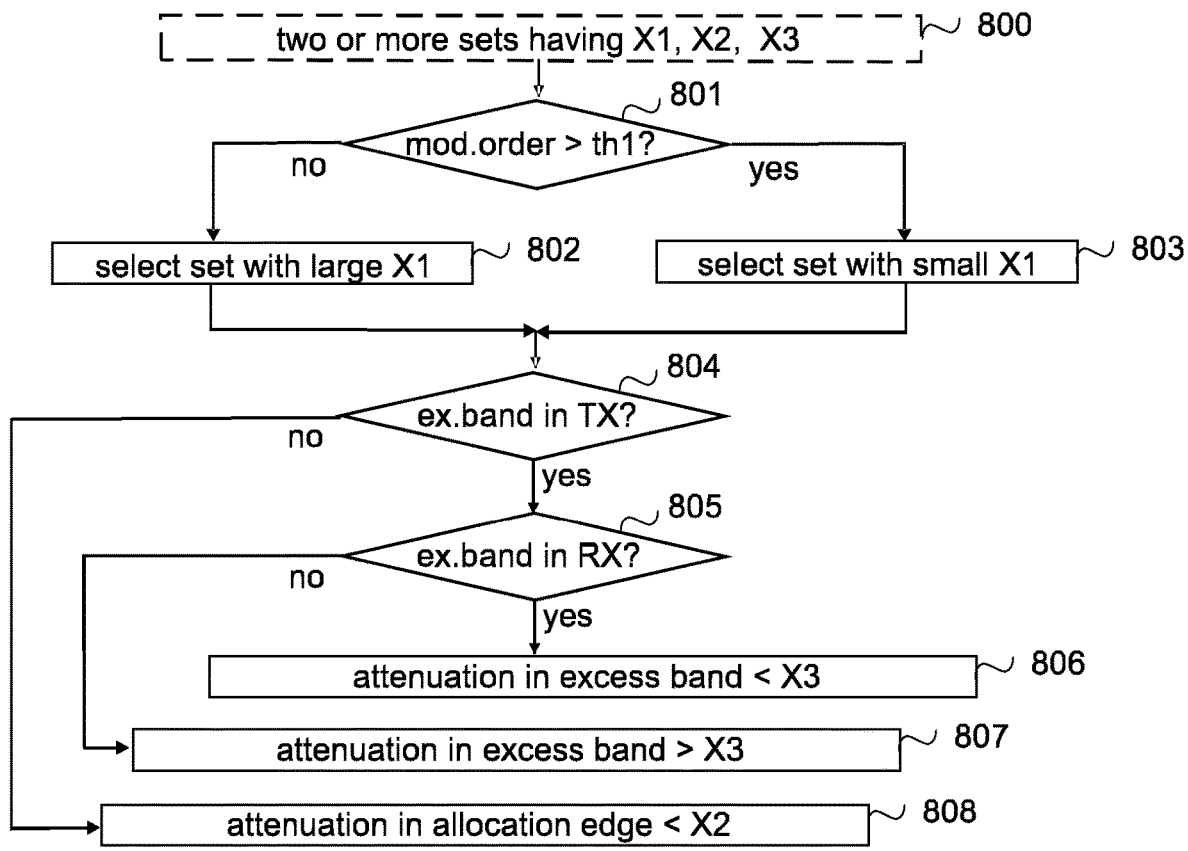
Figure 9:
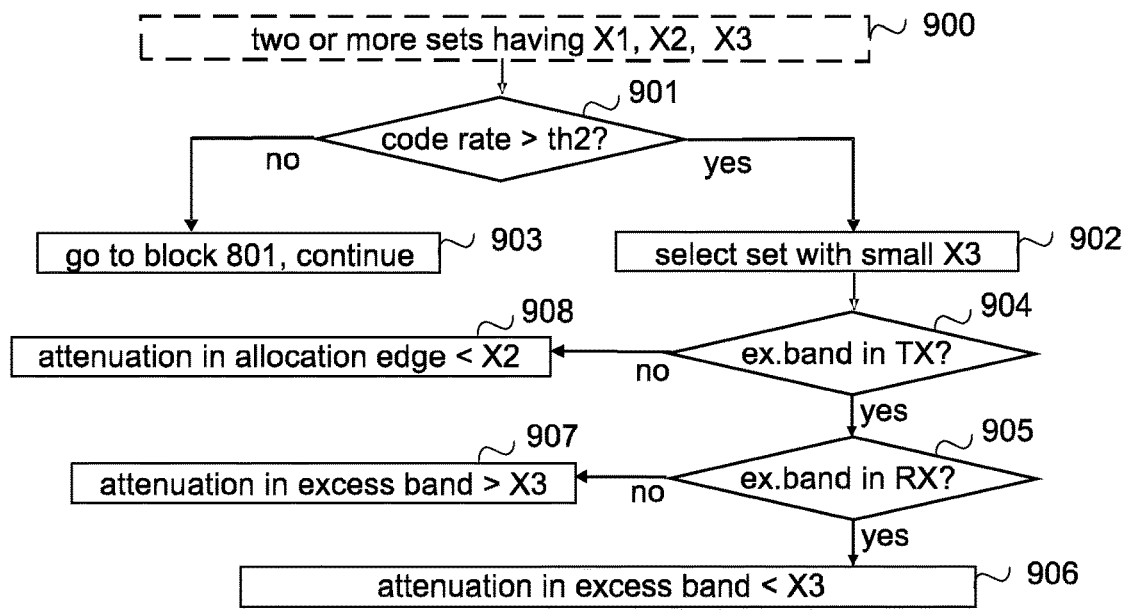
Figure 10:
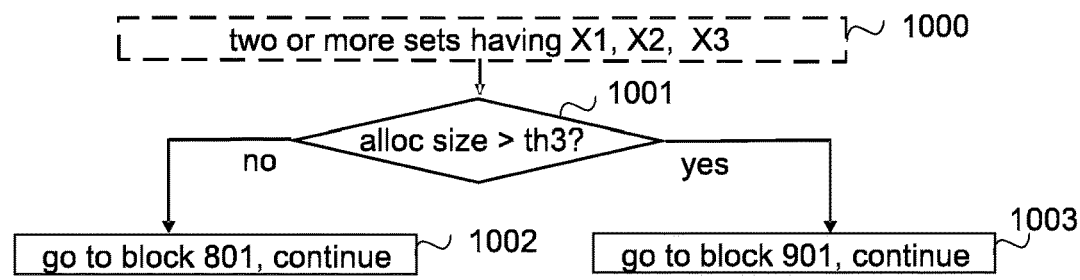

A more detailed examples how different information may be used are illustrated in FIGS. 8 to 10. In the illustrated examples it is assumed that even in case a selected set contains a parameter value X3 for the excess band, it is not used, if the excess band is not used.

In the example illustrated in FIG. 8, the apparatus comprises two or more sets of spectral flatness requirements having also a parameter value X3 for the excess band. This is depicted by dashed block 800.

Further, in the illustrated example of FIG. 8, the modulation schemes are separated to two categories, i.e. to modulation schemes having modulation order above 4, like 16 QAM (quadrature amplitude modulation), 64 QAM, 254 QAM, etc., and those having the modulation order equal to or less than 4, like BPSK, QPSK. However, it should be appreciated that different value for the threshold may be used, and also more than two categories may be used.

Referring to FIG. 8, when the modulation order is below a preset threshold (block 801: no), a set with a large value for parameter X1 (for the first in-band range in the center) is selected in block 802, and then it is checked in block 804, whether the excess band is used in transmissions. Selecting a set with large value X1, for example 5-6 dB, means that more power can be used in central physical resource blocks. That allows a triangular-like filter shape, in which, when moving from the center towards the allocation edge, more attenuation is introduced. This means that in scenarios which are not error vector magnitude limited, for example scenarios with lower-order modulations, in-band emissions may be improved. The set having a large value X1 may comprise a larger X2 (meaning that the value of X2 may be rather close to the value of X1) and a larger X3 (meaning that the value of X3 may be rather close to the value of X2).

When the excess band is used in transmissions (block 804:yes), it is checked in block 805 whether the excess band is used in reception. If the excess band is used also in the reception (block 805: yes), attenuation in the excess band is selected in block 806 to be smaller than the parameter value X3 in the selected set. If the excess band is not used in the reception (block 805: no), attenuation in the excess band is selected in block 807 to be bigger than the parameter value X3.

If the excess band is not used in transmission (block 804: no), attenuation in allocation edge is selected in block 808 to be less than value X2 in the set selected.

If the modulation order is above the first threshold (block 801: yes), a set with a small value for parameter X1 (for the first in-band range in the center), is selected in block 803, and then the process proceeds to block 804 to check, whether the excess band is used in transmissions. Selecting a set with the small value for parameter X1, for example a value of 0-1 dB, results to a transmission with constant power in central physical resource blocks to avoid degrading of the error vector magnitude. The set selected may comprise, in addition to the small X1, large X2 (meaning that the value of X2 is not close to the value of X1) and large X3 (meaning that the value of X3 is not close to the value of X2).

In the example illustrated in FIG. 9, the apparatus comprises two or more sets of spectral flatness requirements having also a parameter value X3 for the excess band. This is depicted by dashed block 900.

Further, in the illustrated example of FIG. 9, the code rates are separated to two categories, i.e. to code rates categorized as having high spectral efficiency (above a threshold th2) and code rates categorized as having low spectral efficiency. The threshold may be a code rate ½, for example. The code rate may be defined e.g. as the information bit rate divided by the transmission data rate. However, it should be appreciated that any other value may be used as the threshold and more than two categories may be used.

Referring to FIG. 9, when the code rate is above the preset threshold th2 (block 901: yes), a set with a small value for parameter X3 is selected in block 902, and then it is checked in block 904, whether the excess band is used in transmissions. When the excess band is used in transmissions (block 904:yes), it is checked in block 905 whether the excess band is used in reception. If the excess band is used also in the reception (block 905: yes), attenuation in the excess band is selected in block 906 to be smaller than the parameter value X3 in the selected set. If the excess band is not used in the reception (block 905: no), attenuation in the excess band is selected in block 907 to be bigger than the parameter value X3 in the selected set. If the excess band is not used in transmission (block 904: no), attenuation in allocation edge is selected in block 908 to be less than value X2 in the set selected in block 902.

If the modulation order is not above the threshold th2 (block 901: no), the process proceeds (block 903) to block 801 in FIG. 8, to perform the selection based also on the modulation order in use.

In the example illustrated in FIG. 10, the apparatus comprises two or more sets of spectral flatness requirements having also a parameter value X3 for the excess band. This is depicted by dashed block 1000.

Further, in the illustrated example of FIG. 10, the allocation size, which may be one of the alternatives listed above, or any combined allocation sizes thereof, are separated to two categories, i.e. to high allocation sizes (above a threshold th3) and low allocation sizes. For example, if the maximum number of resource blocks that can be allocated is 100, the threshold may be 50. However, it should be appreciated that any other value may be used as the threshold and more than two categories may be used.

Referring to FIG. 10, if the allocation size is not above the threshold th3 (block 1001: no), the process proceeds (block 1002) to block 801 in FIG. 8, to perform the selection based also on the modulation order in use. However, if the allocation size is above the threshold (block 1001: yes), the process proceeds (block 1003) to block 901 in FIG. 9, to perform the selection based at least also on the code rate in use.

Figure 11:
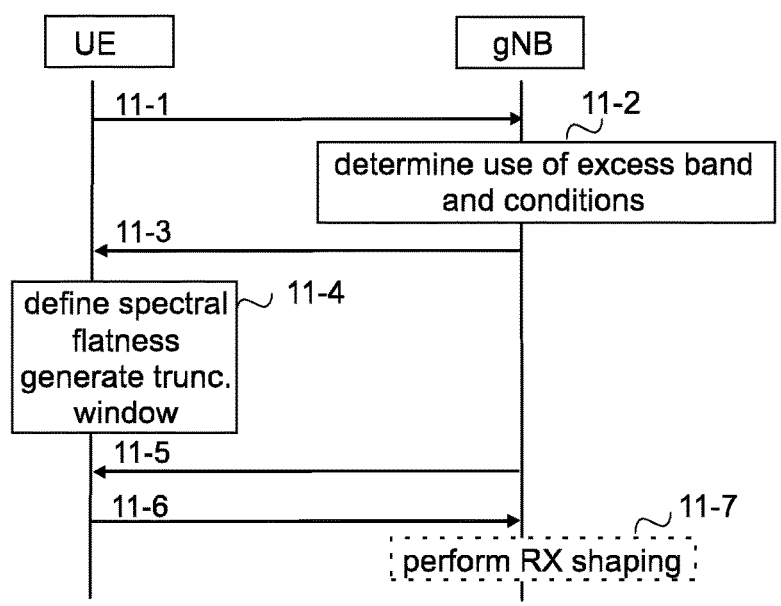
FIG. 11 illustrates an example of information exchange.

FIG. 11 illustrates an example of information exchange between a transmitting apparatus, depicted by user device UE, and a receiving apparatus, for example an access node, depicted by gNB. In the illustrated example, the receiving apparatus, i.e. the access node, is configured to determine whether the excess band may be utilized in the transmission.

Referring to FIG. 11, UE informs, by sending a notification (message 11-1), gNB that UE has filtering capabilities, i.e. is configured to perform spectral shaping as described above. The notification, or corresponding message, may be sent, for example, as part of capability information when UE attaches to the network, or in response to UE detecting that it may need to activate filtering procedure to increase a transmission power in order to increase a link performance. It should be appreciated sending the information on filtering capabilities may be caused because of some other reasons. It should be appreciated that message 11-1 may not be sent, for example since gNB may be aware of UE capabilities based on some other information sent, the information indicating the filtering capabilities, or at least capability to use excess band in transmissions. Another example in which message 11-1 may not be sent is that the apparatuses operate according to a communication specification defining the filtering capabilities, or at least capability to use excess band in transmissions.

When gNB receives the information on filtering capabilities (or determines it using other information as described above), it determines in block 11-2 whether the excess band can be utilized, and if yes, whether it can be utilized in transmission or in transmission and in reception. In the illustrated example it is assumed that the excess band can be utilized at least in the transmission. Therefore gNB determines in block 11-2 for example, the excess band size UE will be granted, etc. In other words, filtering conditions are determined in block 11-2. The information relating to the use of the excess band is transmitted to UE in message 11-3. Message may be a configuration message, for example "Configure filtering conditions". Content of message 11-3 may be based on following: "excess band used in TX—yes/no; excess band used in RX—yes/no; excess band size, . . . " The content, or at least the information of excess band used in RX, may be seen as receiver assistance information, or frequency domain spectral shaping assistance information.

After receiving message 11-3, and since the excess band is utilized in the illustrated example, UE, using possible also information already available, configures in block 11-4 filtering by defining spectral flatness and by generating a truncated window. The information already available comprises information on propagation conditions, such as modulation, coding rate, etc., size of the in-band allocation ($F_{data}$), power amplifier characteristics, etc. Different examples how to define (determine) the spectral flatness are given above. In an implementation, UE comprises a plurality of filters (filter configurations) amongst which UE selects in block 11-4 a filter that meet the spectral flatness requirements and that is thereby optimized for the transmission scenario.

One way to define the shape of the filter in the frequency domain, is to use so called truncated windows. The basic idea of the truncated windows is to modify a frequency response of a known window function, by using two parameters: a roll-off and a truncation factor. The roll-off defines a shape, or a slope, of the transition band. The truncation factor defines the frequency shift of the transition band towards the allocation center or the allocation edge. The two parameters provide enough degrees of freedom to shape data transmission (signal transmitting data) according to the spectrum flatness requirements. More precisely, the spectral flatness requirement are directly mapped to the maximum allowable attenuation in the different ranges of the spectrum, for example by UE generating first the transition band of the filter in one side of the spectrum by using a pre-set value of a roll-off parameter and a window function to generate the transition band. The value of the roll-off parameter is preferably between zero to one, for example 0.4 or 0.7. may be 0.7. When the transition band is generated, the truncation value is assumed to be zero, causing that the center of the transition band aligns with the allocation edge. Then, by changing the value of the truncation factor the filter can have the wanted attenuation for the different ranges. For example, with a positive value of the truncation factor, the frequency shift is towards the allocation edge, and with a negative value towards the allocation center.

Below some examples of window functions that may be used to define the transition band are given. In the examples, following is assumed:

$$\Delta f_{TB} = \lfloor N_{alloc} \times \rho \rfloor,$$

wherein $\Delta f_{TB}$ is the number of samples for the transition band (TB) of the filter in one side $N_{alloc}$ is the total number of resource elements allocated to UE $\rho$ is the roll-off parameter value

| Window function | Expression for n = 0, 1, . . . $\Delta f_{TB} - 1$ | Parameters value |
|---|---|---|
| Raised Cosine (RC) | $TB(n) = 0.5 \cdot \cos\left(1 + \dfrac{\frac{1}{2} + n}{\Delta f_{TB}}\right)$ | N/A |
| Root Raised Cosine (RRC) | $TB(n) = \sqrt{0.5 \cdot \cos\left(1 + \dfrac{\frac{1}{2} + n}{\Delta f_{TB}}\right)}$ | N/A |
| Hamming | $TB(n) = a_0 - (1 - a_0) \cdot \cos\left(\dfrac{2\pi(n + \Delta f_{TB})}{2\Delta f_{TB}}\right)$ | $a_0 = 0.54$ |
| Hann | $TB(n) = a_0 - (1 - a_0) \cdot \cos\left(\dfrac{2\pi(n + \Delta f_{TB})}{2\Delta f_{TB}}\right)$ | $a_0 = 0.5$ |
| Gaussian | $TB(n) = \exp\left(-\dfrac{1}{2} \cdot \left(\dfrac{n}{\sigma \Delta f_{TB}}\right)\right)$ | $\sigma \leq 0.5$ |

Assuming a positive truncation factor following will be performed:
 1) frequency shift towards the allocation edge is calculated $$N_{trunc} = \lfloor |\beta| \times \Delta f_{TB} \rfloor$$

wherein $N_{trunc}$ is the number of resource elements the frequency shift towards the allocation edge is $\beta$ is the truncation factor value 2) number of ones to be appended in the passband is calculated As a consequence of the shifting of the filter transition band, a number of ones has to be appended in the passband, corresponding to $$N_{ones} = N_{alloc} - \lfloor 0.5 \times \Delta f_{TB} \rfloor \times 2 + 2\lfloor \beta \times \Delta f_{TB} \rfloor$$

wherein $N_{ones}$ is the number of ones to be appended 3) samples falling inside the allocation band are used.

Assuming a negative truncation factor following will be performed:
 1) determining the number of samples of the transition band to discard $$N_{disc} = \dfrac{N_{alloc} \times \beta}{2}$$

wherein $N_{disc}$ is the number to samples to be discarded 2) obtain truncated window in one side after discarding the determined number of samples
 3) comparing the size of the truncated window to the number of allocated resource block in one side of the window
 4) if the size of the truncated window is smaller than the number of allocated resource block in one side, determining a number of ones, or the number of samples with the same amplitude as the first sample of the transition band, that has to be appended in the pass band, corresponding to $$N_{ones} = \dfrac{N_{alloc}}{2} - L_{tWindow}$$

wherein $L_{tWindow}$ is the size of the truncated window

Further, when gNB sends a scheduling grant (message 11-5), which specifies excess band allocation, UE proceeds with data transmission (message 11-6) and transmit data filtered as defined in block 11-4.

If the excess band is used in reception, gNB performs in block 11-7 the reception shaping, for example as described with FIG. 3, to the received data.

In a scenario in which all UEs have filtering capabilities, message 1-11 could be a notification notifying that there is a need to activate filtering capabilities.

It should be appreciated that information whether an excess band can be used by the transmitting apparatus and information whether the excess band is used in receiving transmission (reception) may be sent in separate messages, one of them being a semi-static information sent for example less frequently, for example only when UE capability information is acknowledged or a cell is entered, whereas the other one may be more dynamic information, sent for example when acknowledging uplink resource requests. Naturally both information can be semi-static or dynamic. A still further possibility to send the information whether an excess band can be used by the transmitting apparatus and/or the information whether the excess band is used in receiving transmission (reception) by gNB is gNB selecting the set and sending an indication of the set to UE.

Although in the above examples the transmitting apparatus is configured to take into account whether or not the receiving apparatus indicates its capability to perform reception shaping, the transmitting apparatus may be configured to ignore the information, i.e. perform selecting the set (or values) for spectrum shaping and using it for filtering as if the receiving apparatus had indicated no capability to perform the reception shaping.

Figure 12:
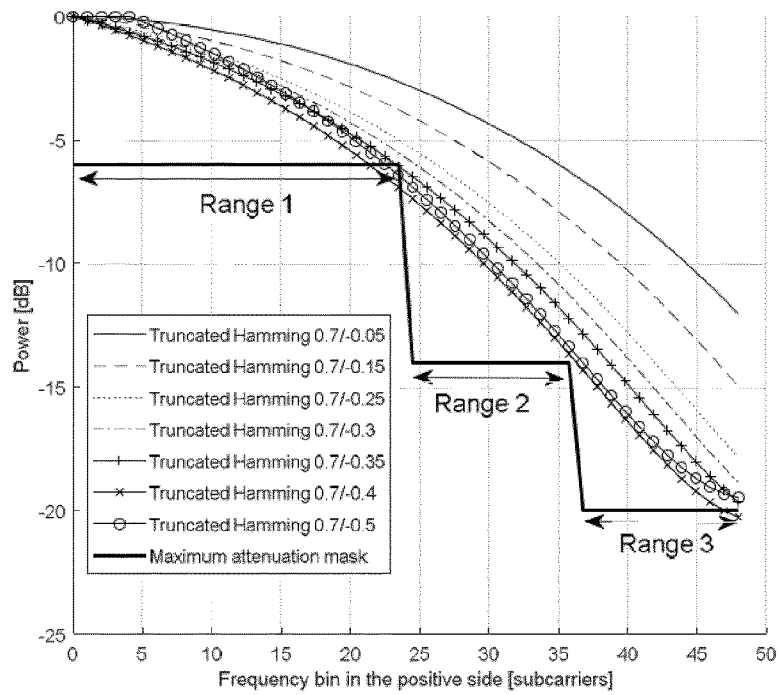
FIGS. 12 and 13 illustrate different examples of truncated filters.
Figure 13:
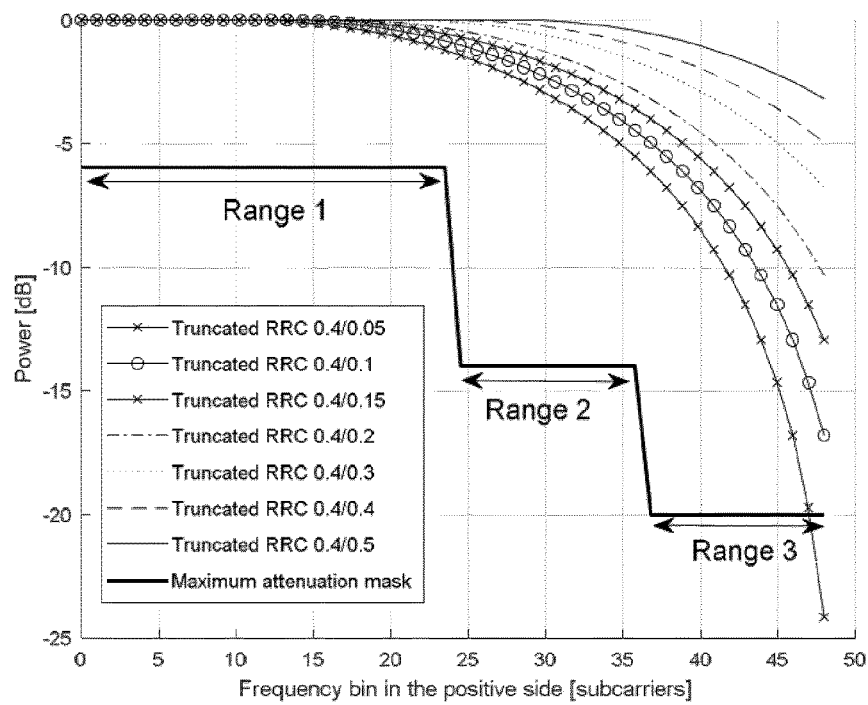

FIGS. 12 and 13 illustrate different examples of truncated filters, and more precisely how the value of the truncation factor may be used in tuning.

FIG. 12 illustrates filters based on Hamming function for the transition band with roll-off value 0.7, with different negative truncation factor values. FIG. 13 illustrates filters based on root raised cosine function for the transition band with roll off value 0.4 and different positive truncation factor values. In both Figures y-axis is power in dB and x-axis is frequency bin (sub carriers) in the positive side. Range 1 corresponds to the hatched area above range 201 in FIG. 2, Range 2 corresponds to the hatched area above range 202 in FIG. 2 and Range 3 corresponds to the hatched area above range 203 in FIG. 2. In the examples the attenuation for the frequency Range 1 and Range 2 is the same as the currently accepted for π/2 BPSK (pi/2 binary phase shift keying) with frequency domain spectral shaping. Range 3 in which more attenuation may be possible, is assumed to be 25%. As can be seen, in the example of FIG. 12 more power is allocated in the center of the allocation, and hence the filters may be used for lower order modulations. In the example of FIG. 13, the power is more constant for Range 1, and hence the filters may be used for higher order modulations.

As can be seen from the above examples, the transmitting apparatus can be configured to dynamically select the spectral flatness for the excess band, when the excess band is in use at least in the transmitting side. This provides means to control spectral shaping or filtering to guarantee a good system performance in various conditions while allowing power amplifier implementations and performance optimizations to remain vendor-specific. Further, the illustrated examples enable selecting frequency-domain windows with good peak to average power ratio performance.

The blocks, related functions, and information exchanges described above by means of FIGS. 2 to 13 are in no absolute chronological order, and some of them may be performed simultaneously or in an order differing from the given one. Other functions can also be executed between them or within them, and other information may be transmitted, and/or other rules applied. Some of the blocks or part of the blocks or one or more pieces of information can also be left out or replaced by a corresponding block or part of the block or one or more pieces of information. For example, checking in block 503 whether the excess band is used also in reception may be omitted when X3 defines such a large value that there is no need to use a filter with attenuation larger than X3 for the excess band.

Figure 14:
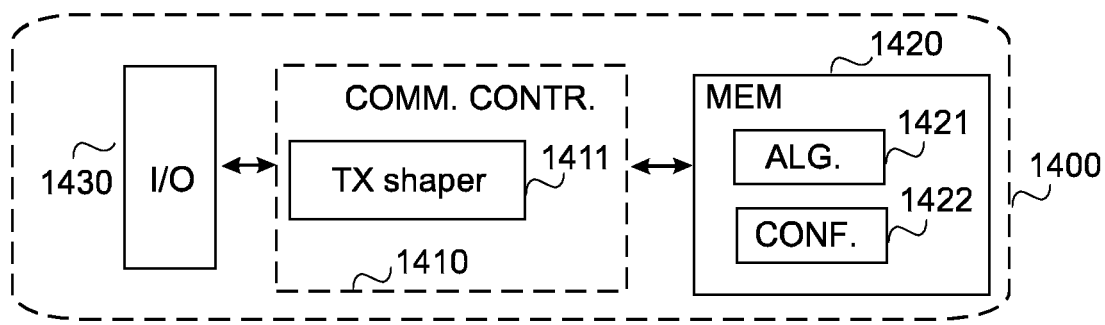
FIGS. 14 and 15 are schematic block diagrams.
Figure 15:
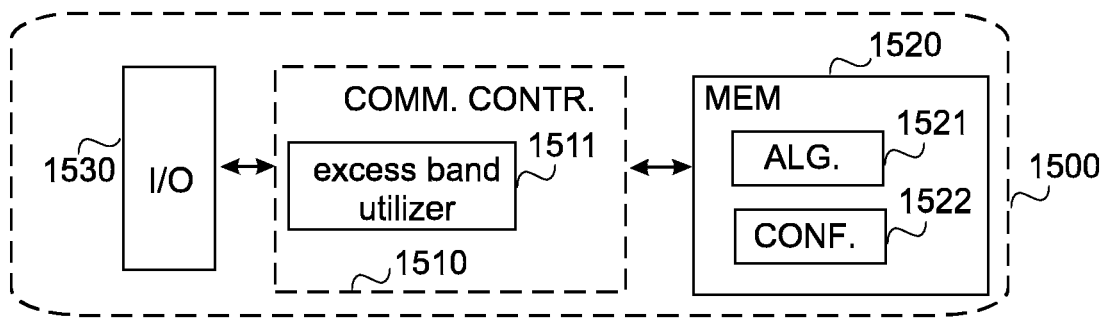

FIGS. 14 and 15 illustrate apparatuses comprising a communication controller 1410, 1510 such as at least one processor or processing circuitry, and at least one memory 1420, 1520 including a computer program code (software, algorithm) ALG. 1421, 1521, wherein the at least one memory and the computer program code (software, algorithm) are configured, with the at least one processor, to cause the respective apparatus to carry out any one of the embodiments, examples and implementations described above. FIG. 14 illustrates an apparatus configured to at least use in transmissions the excess band, if resources are allocated from the excess band for transmission, and FIG. 15 illustrates an apparatus configured at least to receive transmissions over the excess band if resources are allocated for transmissions from the excess band. Naturally, the apparatuses may be merged, i.e. the apparatus may be configured to receive data over the excess band and transmit data over the excess band. The apparatuses of FIGS. 14 and 15 may be electronic devices.

Referring to FIGS. 14 and 15, the memory 1420, 1520 may be implemented using any suitable data storage technology, such as semiconductor based memory devices, flash memory, magnetic memory devices and systems, optical memory devices and systems, fixed memory and removable memory. The memory may comprise a configuration storage CONF. 1421, 1521, such as a configuration database, for at least storing (permanently, semi-permanently and/or temporarily) one or more spectral flatness requirements and/or corresponding parameters/parameter values, for example the plurality of sets, and/or information to generate truncated windows and/or information on use of excess band and/or information indicating capability to use excess band). The memory 1420, 1520 may further store a data buffer for data waiting for transmission and/or data waiting to be decoded.

Referring to FIG. 14, the apparatus 1400 may further comprise a communication interface 1430 comprising hardware and/or software for realizing communication connectivity at least according to one or more radio communication protocols. The communication interface 1430 may provide the apparatus with radio communication capabilities with one or more base stations (access nodes) of a wireless network, or with radio communication capabilities with one or more devices/apparatuses, e.g. user equipments, served by the apparatus. The communication interface may comprise standard well-known analog radio components such as an amplifier, filter, frequency-converter and circuitries, conversion circuitries transforming signals between analog and digital domains, and one or more antennas. Digital signal processing regarding transmission and/or reception of signals may be performed in a communication controller 1410, using in the transmission spectral shaping, for example.

The apparatus 1400 may further comprise an application processor (not illustrated in FIG. 14) executing one or more computer program applications that generate a need to transmit and/or receive data. The application processor may execute computer programs forming the primary function of the apparatus. For example, if the apparatus is a sensor device, the application processor may execute one or more signal processing applications processing measurement data acquired from one or more sensor heads. If the apparatus is a vehicular apparatus, or computer system of a vehicle, the application processor may execute a media application and/ or an autonomous driving and navigation application. If the apparatus is an access node or a relay node, the application processor may execute access/relay applications. In an embodiment, at least some of the functionalities of the apparatus of FIG. 14 may be shared between two physically separate devices, for example remote radio heads and a controlling unit, forming one operational entity. Therefore, the apparatus may be seen to depict the operational entity comprising one or more physically separate devices for executing at least some of the processes described above with respect to a transmitting device (transmitting apparatus).

The communication controller 1410 may comprise one or more transmission shaping circuitries (TX shaper) 1411 configured to perform spectral shaping according to any one of the embodiments/examples/implementations described above.

Referring to FIG. 15, the apparatus comprises one or more communication interfaces 1530 comprising hardware and/or software for realizing communication connectivity according to one or more communication protocols. The communication interface 1530 may provide the apparatus with radio communication capabilities with one or more devices/apparatuses/user equipment served by the apparatus, or at least capable to transmit to the apparatus 1500, and communication capabilities provide the apparatus with radio communication capabilities with one or more base stations (access nodes) of a wireless network, and/or wired/wireless connections towards the core network. The communication interface may comprise standard well-known components such as an amplifier, filter, frequency-converter, (de)modulator, and encoder/decoder circuitries and one or more antennas.

The communication controller 1510 comprises excess band utilizer circuitry 1511 configured to provide at least information on whether the excess band is usable in transmissions Further, in an embodiment the excess band utilizer circuitry may comprise components (circuitry/circuitries) described in detail with FIG. 3.

In an embodiment, at least some of the functionalities of the apparatus of FIG. 15 may be shared between two physically separate devices, forming one operational entity. Therefore, the apparatus may be seen to depict the operational entity comprising one or more physically separate devices for executing at least some of the processes described with respect to the training apparatus.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone (smart phone) or a similar integrated circuit in a server, a cellular network device, or another network device.

In an embodiment, at least some of the processes described in connection with FIGS. 2 to 13 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform (carry out) at least some of the functionalities according to any one of the embodiments/ examples/implementations of FIGS. 2 to 13, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more applicationspecific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 13 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising
at least one processor; and
at least one memory storing instructions that when executed by the at least one processor, cause the apparatus at least to perform:
selecting, using at least first information on whether an excess band is used in transmissions from the apparatus, a set of spectral flatness requirements amongst two or more sets of spectral flatness requirements, wherein at least one of the two or more sets comprises at least a first parameter value for a first in-band range, at least a second parameter value for a second in-band range and at least a third parameter value for an excess band range associated with the excess band; and
defining spectrum shaping using at least the set of spectral flatness requirements selected.

2. The apparatus according to claim 1, wherein the at least one memory and the instructions are configured to, with the at least one processor, cause the apparatus further to at least to perform, when excess band is used in transmissions:
receiving second information indicating at least whether excess band is used in receiving transmissions from the apparatus; and
using the second information in the defining to determine whether attenuation in the excess band range is smaller or bigger than the third parameter value.

3. The apparatus according to claim 1, wherein the at least one memory and instructions are configured to, with the at least one processor, cause the apparatus further to at least to perform:
using also information on modulation scheme and/or a code rate in the selection.

4. The apparatus according to claim 3, wherein the at least one memory and instructions are configured to, with the at least one processor, cause the apparatus further to at least to perform:
using also information on an allocation size in the selection.

5. The apparatus according to claim 1, wherein the at least one memory and instructions are configured to, with the at least one processor, cause the apparatus further to at least to perform:
defining shaping of a transition band using a roll-off parameter and defining frequency shift of the transition band and its direction based on a value of a truncation factor.

6. The apparatus according to claim 1, wherein the spectral flatness requirements are error vector magnitude equalizer spectral flatness requirements.

7. The apparatus according to claim 1, wherein the selecting is performed in response to receiving from a second apparatus information comprising at least as the first information that excess band is usable in the transmissions from the apparatus to the second apparatus.

8. The apparatus according to claim 2, wherein at least one of the first information or the second information is received in a control information from a second apparatus, the control information being dynamic or semi-static.

9. An apparatus comprising
at least one processor; and
at least one memory storing instructions that when executed by the at least one processor, cause the apparatus at least to perform:
causing informing a first apparatus using in-band and excess band in transmissions from the first apparatus to the apparatus whether a spectrum shaping is performed to received transmissions; and
performing spectrum shaping of received transmissions at least by performing channel estimation on an in-band allocation and an excess band allocation for transmissions from the first apparatus.

10. The apparatus according to claim 9, wherein performing spectrum shaping of received transmissions further comprises:
calculating a sub-carrier wise product with a result of the channel estimation;
combining excess band and in-band resource elements and channel estimations; and
performing power equalization on an in-band portion of a result of the combining.

11. A method for an apparatus, the method, when performed by the apparatus, comprising:
selecting, using at least first information on whether an excess band is used in transmissions from the apparatus, a set of spectral flatness requirements amongst two or more sets of spectral flatness requirements, wherein at least one of the two or more sets comprises at least a first parameter value for a first in-band range, at least a second parameter value for a second in-band range and at least a third parameter value for an excess band range associated with the excess band; and
defining spectrum shaping using at least the set of spectral flatness requirements selected.

12. The method according to claim 11, further comprising, when excess band is used in transmissions:
receiving second information indicating at least whether excess band is used in receiving transmissions from the apparatus; and using the second information in the defining to determine whether attenuation in the excess band range is smaller or bigger than the third parameter value.

13. The method according to claim 12, wherein at least one of the first information or the second information is received in a control information from a second apparatus, the control information being dynamic or semi-static.

14. The method according to claim 11, further comprising:
using also information on modulation scheme and/or a code rate in the selection.

15. The method according to claim 14, further comprising:
using also information on an allocation size in the selection.

16. The method according to claim 11, further comprising:
defining shaping of a transition band using a roll-off parameter and defining frequency shift of the transition band and its direction based on a value of a truncation factor.

17. The method according to claim 11, wherein the spectral flatness requirements are error vector magnitude equalizer spectral flatness requirements.

18. A method for an apparatus, the method, when performed by the apparatus, comprising:
causing informing a first apparatus using in-band and excess band in transmissions from the first apparatus to the apparatus whether a spectrum shaping is performed to received transmissions; and
performing spectrum shaping of received transmissions at least by performing channel estimation on an in-band allocation and an excess band allocation for transmissions from the first apparatus.

19. A non-transitory computer-readable medium comprising program instructions, which, when run by an apparatus, causes the apparatus to carry out at least one of a first process or a second process,
wherein the first process comprises:
selecting, using at least first information on whether an excess band is used in transmissions from the apparatus, a set of spectral flatness requirements amongst two or more sets of spectral flatness requirements, wherein at least one of the two or more sets comprises at least a first parameter value for a first in-band range, at least a second parameter value for a second in-band range and at least a third parameter value for an excess band range associated with the excess band; and
defining spectrum shaping using at least the set of spectral flatness requirements selected;
wherein the second process comprises:
causing informing a first apparatus using in-band and excess band in transmissions from the first apparatus to the apparatus whether a spectrum shaping is performed to received transmissions.

20. The non-transitory computer-readable medium according to claim 19, wherein the second process further comprises:
performing spectrum shaping of received transmissions at least by performing channel estimation on an in-band allocation and an excess band allocation for transmissions from the first apparatus.

* * * * *